(12) United States Patent
Igarashi et al.

(10) Patent No.: US 6,516,609 B2
(45) Date of Patent: Feb. 11, 2003

(54) COMPRESSION IGNITION TYPE ENGINE

(75) Inventors: Kohei Igarashi, Susono (JP); Shizuo Sasaki, Numazu (JP); Hiroki Murata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/022,234

(22) Filed: Dec. 20, 2001

(65) Prior Publication Data

US 2002/0083701 A1 Jul. 4, 2002

(30) Foreign Application Priority Data

Dec. 28, 2000 (JP) ........................................ 2000-402262

(51) Int. Cl.[7] ................................................. F01N 3/00
(52) U.S. Cl. .................... 60/284; 60/278; 60/280; 60/295; 60/297; 180/65.2; 180/65.3
(58) Field of Search ............................ 60/278, 280, 284, 60/285, 295, 297, 276; 180/65.2, 65.3, 65.4

(56) References Cited

U.S. PATENT DOCUMENTS

| | | | |
|---|---|---|---|
| 5,785,138 A | * | 7/1998 | Yoshida ..................... 180/65.2 |
| 5,937,639 A | | 8/1999 | Sasaki et al. |
| 6,055,968 A | | 5/2000 | Sasaki et al. |
| 6,109,025 A | * | 8/2000 | Murata et al. ................ 60/297 |
| 6,129,075 A | | 10/2000 | Murata et al. |
| 6,173,569 B1 | * | 1/2001 | Kusada et al. ................ 60/277 |
| 6,321,530 B1 | * | 11/2001 | Hoshi et al. .................. 60/274 |

FOREIGN PATENT DOCUMENTS

JP          A 5-328528          12/1993

* cited by examiner

Primary Examiner—Thomas Denion
Assistant Examiner—Binh Tran
(74) Attorney, Agent, or Firm—Oliff & Berridge, PLC

(57) ABSTRACT

There is provided a compression ignition type engine comprising an exhaust gas purification catalyst, and an electric motor for generating an output separated from the engine output. The engine may selectively perform a first control to make the engine output an output larger than that determined on the basis of the engine operation state, and a second control to operate the engine under the first combustion mode in which the inert gas amount in the chamber is larger than that in which the soot generation amount is peak.

5 Claims, 15 Drawing Sheets

COMPRESSION IGNITION TYPE ENGINE

BACKGROUND OF THE INVENTION

1. Field of the Invention

The present invention relates to a compression ignition type engine.

2. Description of the Related Art

In the prior art, it is known to arrange an exhaust gas purification catalyst in an engine exhaust passage for purifying components included in an exhaust gas discharged from the engine. There is a minimum temperature for the catalyst to activate and to begin the action of purification of the catalyst. Normally, the temperature of the catalyst is increased to the activation temperature by the exhaust gas flowing into the catalyst. However, the temperature of the exhaust gas may be low depending on the engine operation state and, in this state, the temperature of the catalyst may be lower than the activation temperature. To solve this problem, a method is disclosed in the Japanese Unexamined Patent Publication No. 5-328528, for increasing the temperature of the catalyst to above the activation temperature in the above state.

In this Publication, for example, when the operation of the engine starts and it is presumed that the temperature of the exhaust gas is low, the engine is operated at twice the normal engine speed to increase the temperature of the exhaust gas, thereby increasing the temperature of the catalyst to the activation temperature.

In the case that the temperature of the catalyst is increased as explained above, it is necessary to operate the engine at twice the normal engine speed, and therefore, the fuel consumption of the engine becomes large. To solve this problem, in the above mentioned Publication, when the engine is operated at the high engine speed, an electric motor is driven as a generator by the output of the engine to store the excess output as electric power. The electric power is used to supplement the output of the engine, depending on the circumstances.

However, when the excess output of the engine is converted to the electric power by the electric motor serving as a generator, the fuel consumption of the engine at least becomes large because the conversion ratio is not 100 percent.

An object of the present invention is to prevent the fuel consumption of the engine from becoming large while maintaining the exhaust gas purification catalyst in the activated state.

SUMMARY OF THE INVENTION

To accomplish the object of the present invention, in the first invention, there is provided a compression ignition type engine wherein, when an amount of an inert gas in a combustion chamber becomes large, an amount of generation of soot gradually increases to a peak, and when the amount of the inert gas in the combustion chamber becomes even larger, a temperature of fuel and a temperature of a gas around the fuel at a combustion of the fuel in the combustion chamber becomes lower than a temperature which soot is generated, and thus, almost no soot is generated, comprising; means for selectively performing a first combustion mode in which the amount of the inert gas in the combustion chamber is larger than that of the inert gas in which the amount of generation of the soot is a peak, and a second combustion mode in which the amount of the inert gas in the combustion chamber is smaller than that in which the amount of generation of the soot is a peak; an exhaust gas purification catalyst arranged in an engine exhaust passage for purifying components included in an exhaust gas; an electric motor for outputting an output separated from the output of the engine, when the engine is operated such that the engine outputs a value of the output determined on the basis of the engine operation state, the output of the electric motor supplementing the shortage of the output of the engine relative to the requested output; and means for selectively performing a first control to operate the engine such that the engine outputs an output larger than the value of the output determined on the basis of the engine operation state, and a second control to operate the engine under the first combustion mode; wherein when the temperature of the exhaust gas purification catalyst should be increased, one of the first and second controls is performed on the basis of a predetermined conditions.

In the second invention according to claim 2, the engine further comprises a battery, and when the output of the engine is larger than the value of the output determined on the basis of the engine operation state, the electric motor is driven as a generator by the output of the engine to store the output of the engine in the battery as an electric power, and when the temperature of the exhaust gas purification catalyst should be increased and the amount of charged electric power in the battery is smaller than a requested amount, the first control is performed, and on the other hand, when the temperature of the exhaust gas purification catalyst should be increased and the amount of charged electric power in the battery is larger than the requested amount, the second control is performed.

In the third invention according to claim 1, the exhaust gas purification catalyst has a $NO_x$ catalyst for purifying the $NO_x$ included in the exhaust gas.

In the fourth invention according to claim 2, the $NO_x$ catalyst has a $NO_x$ absorbent which absorbs the $NO_x$ included in the exhaust gas when the air fuel ratio of the exhaust gas flowing into the catalyst is lean and releases the absorbed $NO_x$ therefrom when the air fuel ratio of the exhaust gas flowing into the catalyst becomes one of the stoichiometric air fuel ratio and a rich air fuel ratio.

In the fifth invention according to claim 1, it is judged that the temperature of the exhaust gas purification catalyst should be increased when the temperature of the exhaust gas purification catalyst is lower than a temperature in which the catalyst is activated to purify the components included in the exhaust gas.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
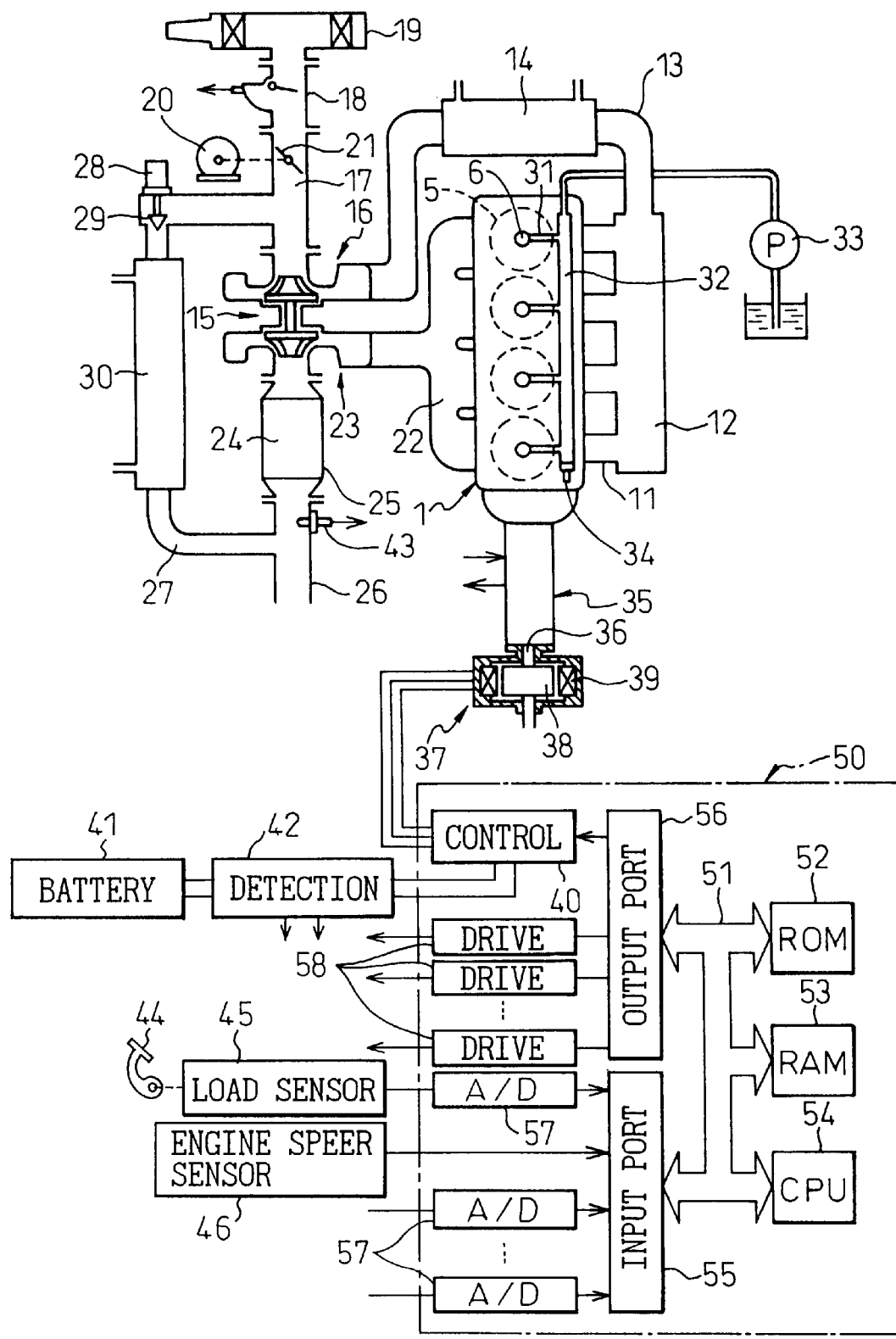
FIG. 1 is a general view of a compression ignition type engine.
Figure 2:
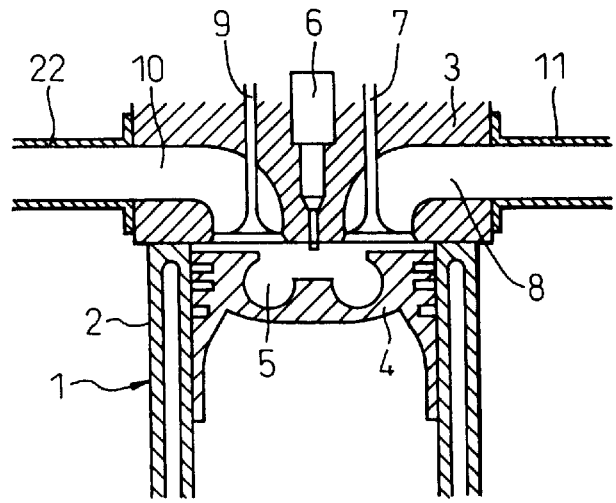
FIG. 2 is a side sectional view of an engine body.

FIGS. 1 and 2 show the case of application of the present invention to a four-stroke compression ignition type engine.

Referring to FIGS. 1 and 2, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake branch tube 11 to a surge tank 12. The surge tank 12 is connected through an intake duct 13 and an intercooler 14 to an outlet of a compressor 16 of a supercharger, for example, an exhaust turbocharger 15. An inlet of the compressor 16 is connected through an intake duct 17 and an air flow meter 18 to an air cleaner 19. A throttle valve 21 driven by a stepping motor 20 is arranged in the intake duct 17.

On the other hand, the exhaust port 10 is connected through an exhaust manifold 22 to an inlet of an exhaust turbine 23 of the exhaust turbocharger 15. The outlet of the exhaust turbine 23 is connected to a casing 25 housing a $NO_x$ purification catalyst 24 as an exhaust gas purification catalyst. An exhaust pipe 26 connected to the outlet of the casing 25 and the intake duct 17 downstream of the throttle valve 21 are connected to each other through an EGR passage 27. Inside the EGR passage 27 is arranged an EGR control valve 29 driven by a stepping motor 28. Further, inside the EGR passage 27 is arranged an intercooler 30 for cooling the EGR gas flowing inside the EGR passage 27. In the embodiment shown in FIG. 1, the engine cooling water is led inside the intercooler 30 where the EGR gas is cooled by the engine cooling water.

On the other hand, each fuel injector 6 is connected through a fuel supply tube 31 to the reservoir, that is, a common rail 32. Fuel is supplied to the common rail 32 from an electrically controlled variable discharge fuel pump 33. Fuel supplied in the common rail 32 is supplied through each fuel supply tube 31 to the fuel injectors 6. A fuel pressure sensor 34 for detecting the fuel pressure in the common rail 32 is attached to the common rail 32. The amount of discharge of the fuel pump 33 is controlled based on the output signal of the fuel pressure sensor 34 so that the fuel pressure in the common rail 32 becomes the target fuel pressure.

On the other hand, in the embodiment shown in FIG. 1, a transmission 35 is connected to the output shaft of the engine. An electric motor 37 is connected to the output shaft 36 of the transmission 35. In this case, as the transmission 35, it is possible to use an ordinary automatic transmission provided with a torque converter, various types of variable speed transmissions, or an automatic transmission of a type enabling automatic clutch operation and gear changing operation in a manual transmission provided with a clutch, etc.

Further, the electric motor 37 connected to the output shaft 36 of the transmission 35 comprises a drive power generating apparatus for generating a drive power separate from the drive power of the engine. In the embodiment shown in FIG. 1, the electric motor 37 is comprised of an AC synchronous electric motor provided with a rotor 38 attached on the output shaft 36 of the transmission 35 and comprised of a plurality of permanent magnets attached to its outer circumference and a stator 38 comprised of an exciting coil forming a rotating field. The exciting coil of the stator 39 is connected to a motor drive control circuit 40. The motor drive control circuit 40 is connected to a battery 41 generating a DC high voltage. A detector 42 is arranged between the motor drive control circuit 40 and the battery 41 for detecting a battery voltage and battery charging and discharging current.

The electronic control unit 50 is comprised of a digital computer and is provided with a ROM (read only memory) 52, a RAM (random access memory) 53, a CPU (microprocessor) 54, an input port 55, and an output port 56, connected to each other by a bidirectional bus 51. The output signals of the air flow meter 18, fuel pressure sensor 34 and detector 42 are input through the corresponding AD converters 57 to the input port 55. Inside the exhaust pipe 26 is arranged a temperature sensor 43 for detecting the temperature of the exhaust gas. The output signals of the temperature sensor 43 are input through the corresponding AD converter 57 to the input port 55. Further, various signals expressing a gear ratio of the transmission 35, a rotational speed of the output shaft 36, etc. are input to the input port 55.

On the other hand, an accelerator pedal 44 has connected to it a load sensor 45 for generating an output voltage proportional to the amount of depression L of the accelerator pedal 44. The output voltage of the load sensor 45 is input through the corresponding AD converter 57 to the input port 55. Further, the input port 55 has connected to it a crank angle sensor 46 for generating an output pulse each time the crankshaft rotates by, for example, 30°. On the other hand, the output port 56 is connected through the corresponding drive circuits 58 to the fuel injector 6, stepping motor 20, EGR control valve 28, fuel pump 33, transmission 35, and motor drive control circuit 40.

The supply of power to the exciting coil of the stator 39 of the electric motor 37 is normally stopped. At that time, the rotor 38 rotates together with the output shaft 36 of the transmission 35. On the other hand, when driving the electric motor 37, the DC high voltage of the battery 41 is converted by the motor drive control circuit 40 to a three-phase alternating current having a frequency fm and a current value Im. This three-phase alternating current is supplied to the exciting coil of the stator 39. The frequency fm is the frequency required for making the rotating field generated by the exciting coil rotate in synchronization with the rotation of the rotor 38. The frequency fm is calculated by the CPU 54 based on the rotational speed of the output shaft 36. In the motor drive control circuit 40, this frequency fm is made the frequency of a three-phase alternating current.

On the other hand, the output torque of the electric motor 37 is substantially proportional to the current value Im of the three-phase alternating current. The current value Im is calculated by the CPU 54 based on the requested output torque of the electric motor 37. In the motor drive control circuit 40, this current value Im is made the current value of the three-phase alternating current.

Further, when the electric motor is in a state driven by an outside force, the electric motor 37 operates as a generator. The electric power generated at that time is stored in the battery 41. Whether or not the electric motor 37 should be driven by an outside force is judged by the CPU 54. When it is judged that the electric motor 37 is to be driven by an outside force, the motor drive control circuit 40 operates so that the electric power generated by the electric motor 37 is stored in the battery 41.

Figure 3:
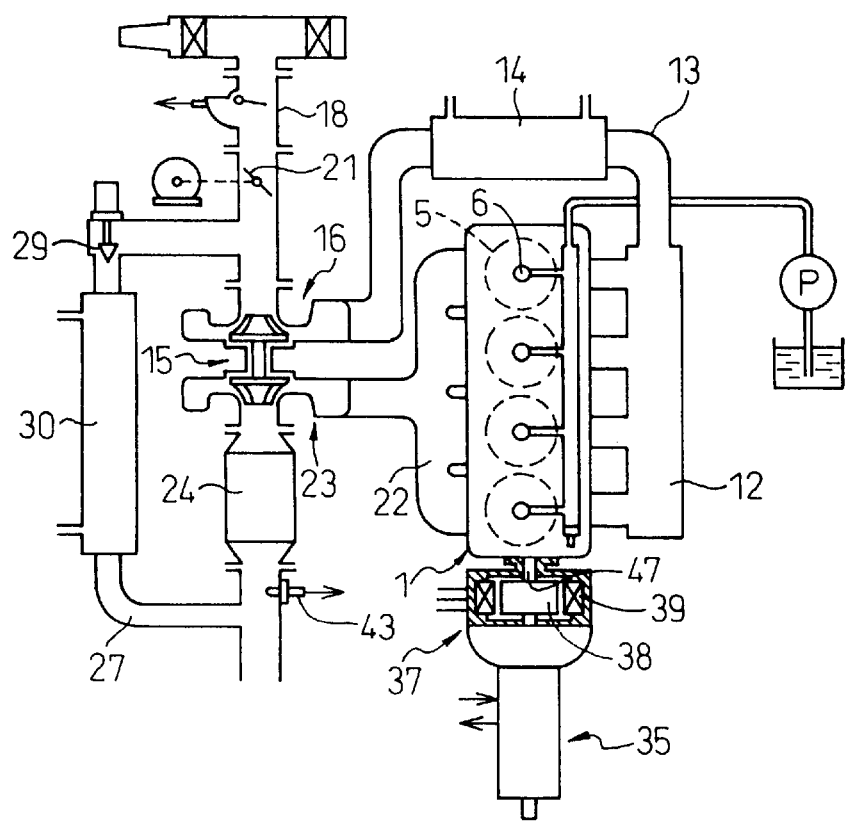
FIG. 3 is a general view of another compression ignition type engine.

FIG. 3 shows another embodiment of a compression ignition type engine. In this embodiment, the electric motor 37 is connected to the output shaft 47 of the engine. The transmission 35 is connected to the output shaft of the electric motor 37. In this embodiment, the rotor 38 of the electric motor 37 is attached to the output shaft 47 of the engine. Therefore, the rotor 38 rotates together with the output shaft 47 of the engine at all times. Further, in this embodiment as well, as the transmission 35, it is possible to use an ordinary automatic transmission provided with a torque converter, various types of variable speed transmissions, or an automatic transmission of a type enabling automatic clutch operation and gear changing operation in a manual transmission provided with a clutch, etc.

Figure 4:
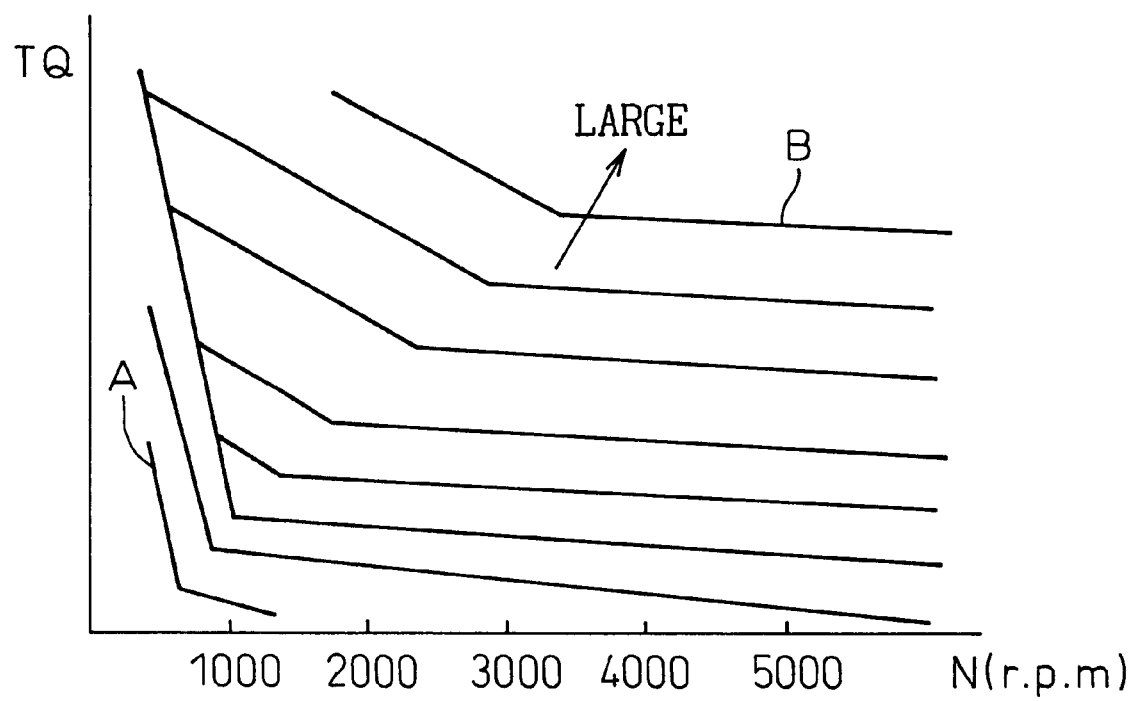
FIG. 4 shows requested torque.

The ordinate TQ in FIG. 4 shows the required torque with respect to the engine. The abscissa N shows the engine rotational speed. The solid lines show the relationship between the required torque and the engine rotational speed N at the same amount of depression of the accelerator pedal 44. Further, the solid line A in FIG. 4 shows when the amount of depression of the accelerator pedal 44 is zero, while the solid line B shows when the amount of depression of the accelerator pedal 44 is maximum. The amount of depression of the accelerator pedal 44 increases from the solid line A to the solid line B. In this embodiment of the present invention, the required torque TQ in accordance with the amount of depression L of the accelerator pedal 44 and the engine rotational speed N is first calculated from the relationship shown in FIG. 4. Then, the amount of fuel injection etc. are calculated based on the required torque TQ.

Now, in this embodiment of the present invention, when the engine load is relatively low, the engine is operated with low temperature combustion where almost no soot is generated. Therefore, first, an explanation will be made of this low temperature combustion where almost no soot is generated.

Figure 5:
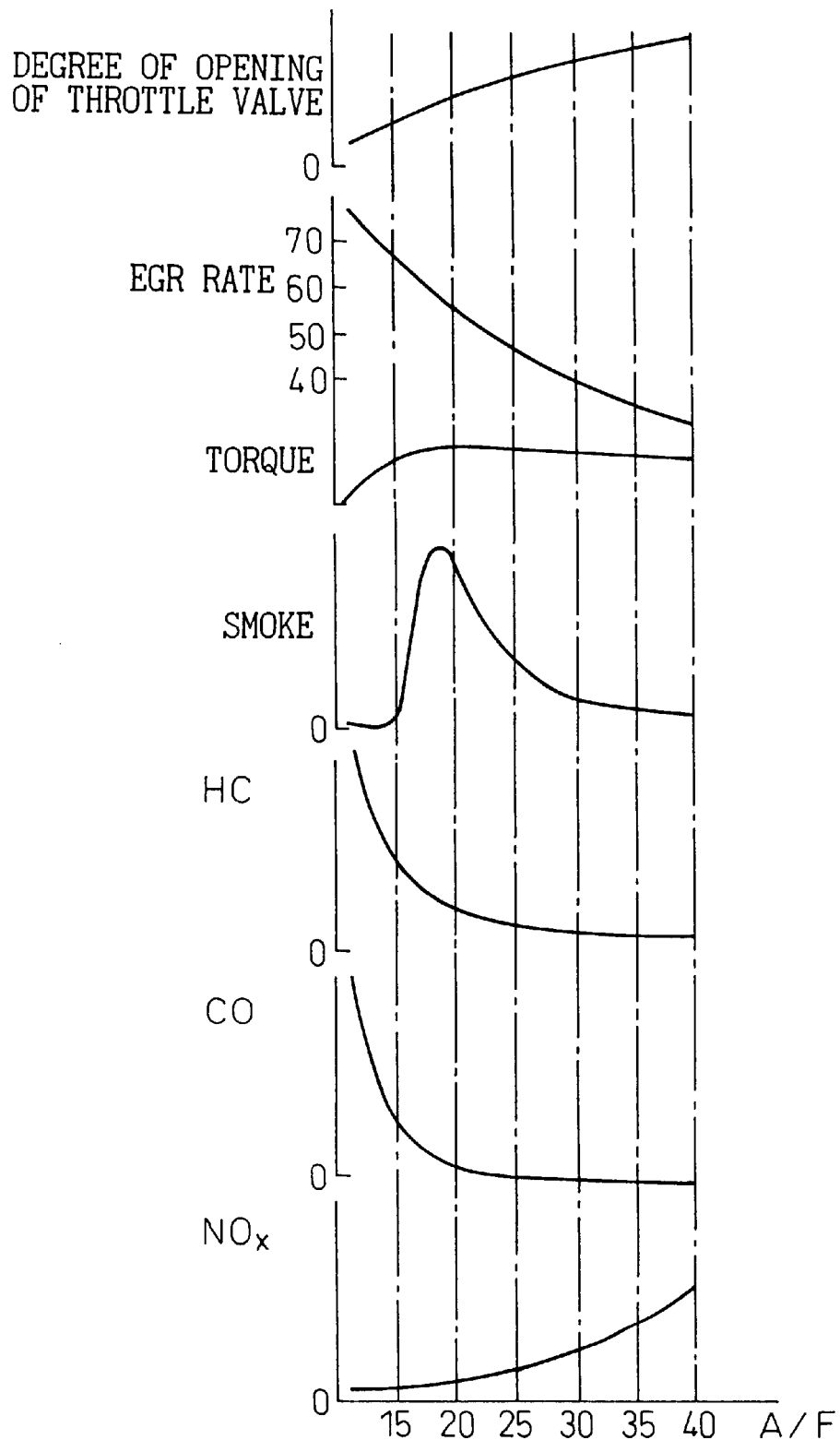
FIG. 5 shows amounts of generation of smoke and $NO_x$ etc.

FIG. 5 shows an example of an experiment showing the change in output torque and the change in the amount of exhaust of smoke, hydrocarbons, carbon monoxide, and $NO_x$ when changing the air-fuel ratio A/F (abscissa in FIG. 5) by changing the opening degree of the throttle valve 21 and the EGR rate at the time of a low load operation of the engine. As will be understood from FIG. 5, in this experiment, the smaller the air-fuel ratio A/F becomes, the larger the EGR rate is. At the stoichiometric air-fuel ratio (=14.6) or less, the EGR. rate becomes at least 65 percent.

As shown in FIG. 5, if the air-fuel ratio A/F is made smaller by increasing the EGR rate, the EGR rate becomes close to 40 percent. When the air-fuel ratio A/F becomes about 30, the amount of smoke generated starts to increase. Next, if the EGR rate is further raised and the air-fuel ratio A/F made smaller, the amount of smoke generated rapidly increases and then peaks. Next, if the EGR rate is further raised and the air-fuel ratio A/F made smaller, the smoke then rapidly decreases. When the EGR rate is made at least 65 percent and the air-fuel ratio A/F becomes close to 15.0, the smoke produced becomes substantially zero. That is, almost no soot is produced any longer. At this time, the output torque of the engine falls somewhat and the amount of $NO_x$ generated drops considerably. On the other hand, the amounts of hydrocarbons and carbon monoxide generated start to increase.

Figure 6A:
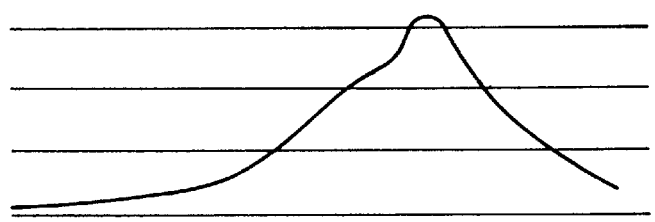
FIGS. 6A and 6B show combustion pressure.
Figure 6B:
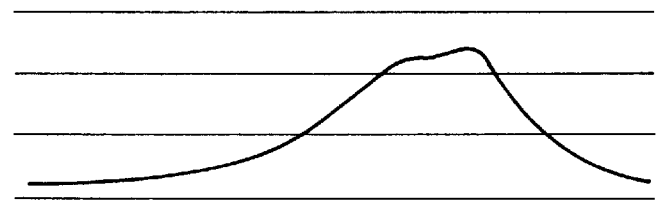

FIG. 6A shows the changes in compression pressure in the combustion chamber 5 when the amount of smoke produced is the greatest near an air-fuel ratio A/F of 21. FIG. 6B shows the changes in compression pressure in the combustion chamber 5 when the amount of smoke produced is substantially zero near an air-fuel ratio A/F of 18. As will be understood from a comparison of FIG. 6A and FIG. 6B, the combustion pressure is lower in the case shown in FIG. 6B where the amount of smoke produced is substantially zero than the case shown in FIG. 6A where the amount of smoke produced is large.

The following may be said from the results of the experiment shown in FIG. 5 and FIGS. 6A and 6B. That is, first, when the air-fuel ratio A/F is less than 15.0 and the amount of smoke produced is substantially zero, the amount of $NO_x$ produced falls considerably as shown in FIG. 5. The fact that the amount of $NO_x$ produced falls means that the combustion temperature in the combustion chamber 5 falls. Therefore, it can be said that when almost no soot is produced, the combustion temperature in the combustion chamber 5 becomes lower. The same thing may be said from FIG. 6B. That is, in the state shown in FIG. 6B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 5, the amounts of hydrocarbons and carbon monoxide exhausted increase. This means that the hydrocarbons are exhausted without growing into soot. That is, when the straight chain hydrocarbons and aromatic hydrocarbons contained in the fuel are raised in temperature in an oxygen poor state, they decompose due to the heat resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons contained in the fuel grow to soot through the soot precursor. Therefore, as explained above, when the amount of production of soot becomes substantially zero, the amount of exhaust of hydrocarbons and carbon monoxide increases as shown in FIG. 5, but the hydrocarbons at this time are a soot precursor or in a state of hydrocarbons before that.

Summarizing these considerations based on the results of the experiments shown in FIG. 5 and FIGS. 6A and 6B, when the combustion temperature in the combustion chamber 5 is low, the amount of soot produced becomes substantially zero. At this time, a soot precursor or in a state of hydrocarbons before that is exhausted from the. combustion chamber 5. More detailed experiments and studies were conducted. As a result, it was learned that when the temperature of the fuel and the gas around the fuel in the combustion chamber 5 is below a certain temperature, the process of growth of soot stops midway, that is, no soot at all is produced, and that when the temperature of the fuel and its surroundings in the combustion chamber 5 becomes higher than a certain temperature, soot 2 is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of $NO_x$. Therefore, this certain temperature can be defined to a certain degree from the amount of production of $NO_x$. That is, the greater the EGR rate, the lower the temperature of the fuel and the gas surrounding it at the time of combustion and the lower the amount of $NO_x$ produced. At this time, when the amount of $NO_x$ produced becomes around 10 ppm or less, almost no soot is produced any more. Therefore, the above certain temperature substantially matches the temperature when the amount of $NO_x$ produced becomes 10 ppm or less.

Once soot is produced, it is impossible to remove it by after-treatment using a catalyst having an oxidation action etc. As opposed to this, a soot precursor or a state of hydrocarbons before this can be easily removed by after-treatment using a catalyst having an oxidation action etc. Considering after-treatment by a catalyst having an oxidation action etc., there is an extremely great difference between whether the hydrocarbons are exhausted from the combustion chamber 5 in the form of a soot precursor or in a state before that or exhausted from the combustion chamber 5 in the form of soot.

Now, to stop the growth of hydrocarbons in the state before the production of soot, it is necessary to suppress the temperature of the fuel, and the gas around it, at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough, to absorb an amount of heat sufficient for lowering the temperature is required. Therefore, if the amount of fuel increases, the amount of inert gas required increases along with the same. Note that, in this case, the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use $CO_2$ or EGR gas as the inert gas.

Figure 7:
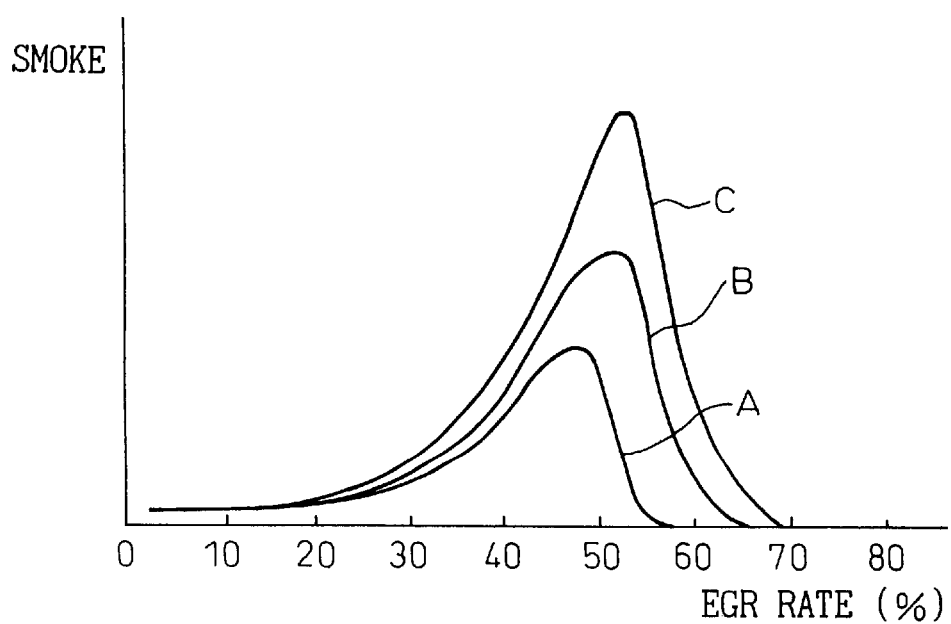
FIG. 7 shows a relationship between the amount of generation of smoke and an EGR ratio.

FIG. 7 shows the relationship between the EGR rate and smoke when changing the degree of cooling of the EGR gas using the EGR gas as an inert gas. That is, in FIG. 7, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

AS shown by the curve A in FIG. 7, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 7, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 7, when not force cooling the EGR gas, the amount of soot produced peaks when the EGR rate is near 55 percent. In this case, almost no soot is produced any longer when the EGR rate is made at least about 70 percent.

Note that FIG. 7 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 8:
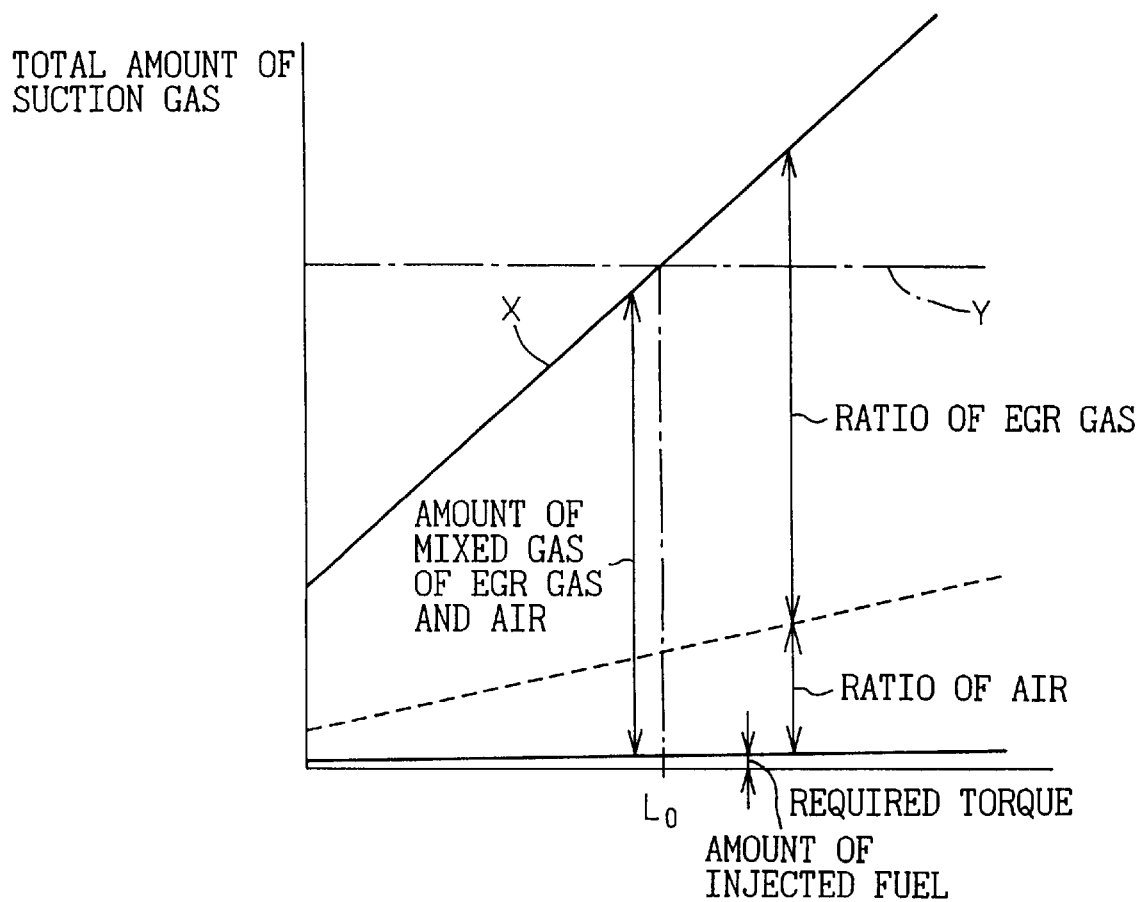
FIG. 8 shows a relationship between amounts of injected fuel and mixed gas.

FIG. 8 shows the amount of mixed gas of EGR gas and air, the ratio of air in the mixed gas, and the ratio of EGR gas in the mixed gas required for making the temperature of the fuel and the gas around it at the time of combustion a temperature lower than the temperature at which soot is produced in the case of use of EGR gas as an inert gas. Note that, in FIG. 8, the ordinate shows the total amount of suction gas taken into the combustion chamber 5. The broken line Y shows the total amount of suction gas able to be taken into the combustion chamber 5 when supercharging is not being performed. Further, the abscissa shows the required torque.

Referring to FIG. 8, the ratio of air, that is, the amount of air in the mixed gas, shows the amount of air necessary for causing the injected fuel to burn completely. That is, in the case shown in FIG. 8, the ratio of the amount of air and the amount of injected fuel becomes the stoichiometric air-fuel ratio. On the other hand, in FIG. 8, the ratio of EGR gas, that is, the amount of EGR gas in the mixed gas, shows the minimum amount of EGR gas required for making the temperature of the fuel and the gas around it a temperature lower than the temperature at which soot is produced. This amount of EGR gas is, expressed in terms of the EGR rate, about at least 55 percent and, in the embodiment shown in FIG. 8, is at least 70 percent. That is, if the total amount of suction gas taken into the combustion chamber 5 is made the solid line, X in FIG. 8 and the ratio between the amount of air and amount of EGR gas in the total amount of suction gas X is made the ratio shown in FIG. 8, the temperature of the fuel and the gas around it becomes a temperature lower than the temperature at which soot is produced and therefore no soot at all is produced any longer. Further, the amount of $NO_x$ produced at this time is around 10 ppm or less and therefore the amount of $NO_x$ produced becomes extremely small.

If the amount of fuel injected increases, the amount of heat generated at the time of combustion increases, so to maintain the temperature of the fuel and the gas around it at a temperature lower than the temperature at which soot is produced, the amount of heat absorbed by the EGR gas must be increased. Therefore, as shown in FIG. 8, the amount of EGR gas has to be increased the greater the amount of injected fuel. That is, the amount of EGR gas has to be increased as the required load becomes higher.

Note that, when not supercharging, the upper limit of the total amount of suction gas taken into the combustion chamber 5 is Y. Therefore, in the region in FIG. 8 where the required torque is larger than $L_0$, the air-fuel ratio cannot be maintained at the stoichiometric air-fuel ratio unless the ratio of EGR gas is reduced as the required torquie becomes larger. In other words, when not supercharging, if desiring to maintain the air-fuel ratio at the stoichiometric air-fuel ratio in the region where the required torque is larger than $L_0$, the EGR rate falls as the required torque becomes higher and therefore in the region where the required torque is larger than $L_0$, the temperature of the fuel and the gas around it can no longer be maintained at a temperature lower than the temperature at which soot is produced.

Note that if, as shown in FIG. 1 and FIG. 3, the EGR gas is made to recirculate through the EGR passage 27 to the inlet side of the supercharger, that is, in the intake duct 17 upstream of the compressor 16 of the exhaust turbo charger 15, it is possible to maintain the EGR rate at 55 percent or more and, for example, at 70 percent, in the region where the required load is larger than $L_0$ and therefore it is possible to maintain the temperature of the fuel and the gas around it at a temperature lower than the temperature at which soot is produced. That is, if the EGR gas is recirculated so that the EGR rate in the intake duct 17 becomes, for example, 70 percent, the EGR rate of the suction gas raised in pressure by the compressor 16 of the exhaust turbocharger 15 also becomes 70 percent and therefore it is possible to maintain the temperature of the fuel and the gas around it at a temperature lower than the temperature at which soot is produced to the extent by which pressure can be raised by the compressor 16. Therefore, it becomes possible to enlarge the operating region of the engine at which low temperature combustion can be caused.

Note that, in this case, when making the EGR rate at least 55 percent in the region where the required torque is larger than $L_0$, the EGR control valve 29 is made to fully open and the throttle valve 21 is made to close somewhat.

As explained above, FIG. 8 shows the case of combustion of fuel at the stoichiometric air-fuel ratio. Even if the amount of air is made smaller than the amount of air shown in FIG. 8, that is, even if the air-fuel ratio is made rich, it is possible to obstruct the production of soot and make the amount of $NO_x$ produced around 10 ppm or less. Further, even if the amount of air is made greater than the amount of air shown in FIG. 8, that is, the average value of the air-fuel ratio is made a lean of 17 to 18, it is possible to obstruct the production of soot and make the amount of $NO_x$ produced around 10 ppm or less.

That is, when the air-fuel ratio is made rich, the fuel becomes in excess, but since the fuel temperature is suppressed to a low temperature, the excess fuel does not grow into soot and therefore soot is almost never produced. Further, at this time, only an extremely small amount of $NO_x$ is produced. On the other hand, when the average air-fuel ratio is lean or when the air-fuel ratio is the stoichiometric air-fuel ratio, a small amount of soot is produced if the combustion temperature becomes higher, but with the combustion method of the present invention, the combustion temperature is suppressed to a low temperature, so almost no soot is produced. Further, only an extremely small amount of $NO_x$ is produced.

In this way, at the time of low temperature combustion, regardless of the air-fuel ratio, that is, whether the air-fuel ratio is rich or the stoichiometric air-fuel ratio or tithe average air-fuel ratio is lean, almost no soot is produced and the amount of $NO_x$ produced becomes extremely small. Therefore, considering the improvement of the fuel efficiency, it may be said to be preferable to make the average air-fuel ratio lean.

On the other hand, at the time of low temperature combustion, the temperature of the fuel and the gas around it becomes lower, but the temperature of the exhaust gas rises. This will be explained with reference to FIGS. 9A and 9B.

Figure 9A:
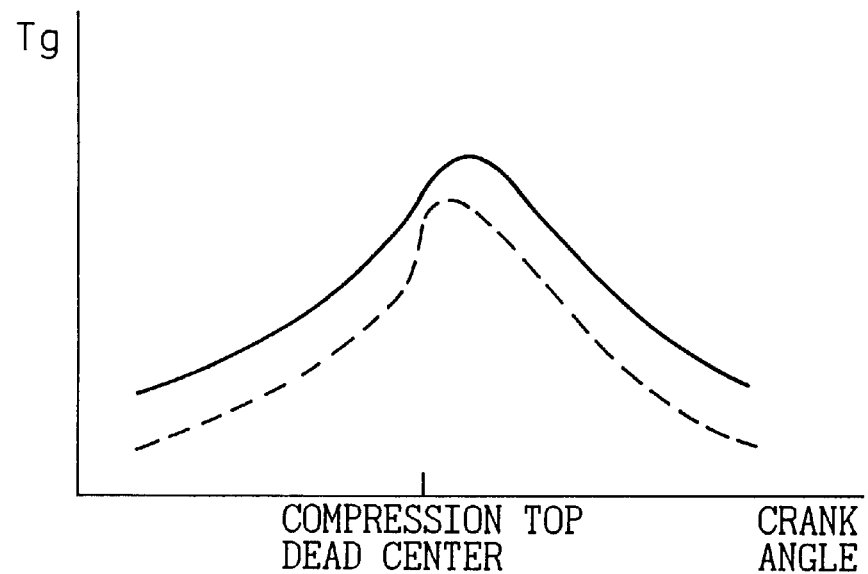
FIGS. 9A and 9B show of temperature of gas in a combustion chamber land etc.
Figure 9B:
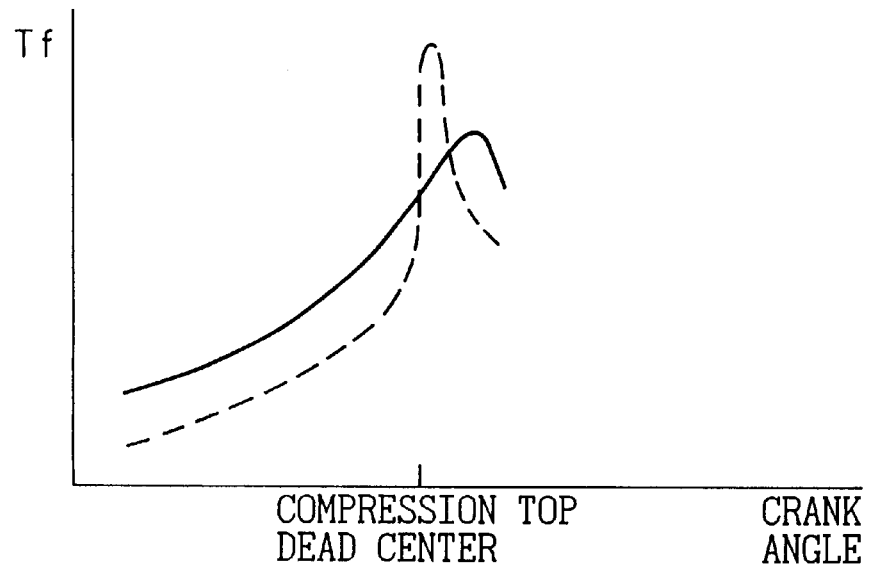

The solid line in FIG. 9A shows the relationship between the average gas temperature Tg in the combustion chamber 5 and the crank angle when low temperature combustion is performed. The broken line in FIG. 9A shows the relationship between the average gas temperature Tg in the combustion chamber 5 and the crank angle when ordinary combustion is performed. Further, the solid line in FIG. 9B shows the relationship between the temperature Tf of the fuel and the gas surrounding it and the crank angle when low temperature combustion is being performed. The broken line in FIG. 9B shows the relationship between the temperature Tf of the fuel and the gas surrounding it and the crank angle when ordinary combustion is being performed.

When low temperature combustion is being performed, the amount of EGR gas is larger compared with when ordinary combustion is being performed and, therefore, as shown in FIG. 9A, before top dead center of the compression stroke, that is, during the compression stroke, the average temperature Tg of the gas at the time of the low temperature combustion shown by the solid line becomes higher than the average temperature Tg of the gas at the time of the ordinary combustion shown by the broken line. Note that, at this time, as shown by FIG. 9B, the temperature, Tf of the fuel and the gas around it becomes substantially the same temperature as the average temperature Tg of the gas.

Next, combustion is started near top dead center of the compression stroke but, in this case, when low temperature combustion is being performed, as shown by the solid line in FIG. 9B, the temperature Tf of the fuel and the gas around it does not become very high due to the heat absorbing action of the EGR gas. As opposed to this, when ordinary combustion is being performed, as shown by the broken line in FIG. 9B, the temperature Tf of the fuel and the gas around it becomes extremely high due to the presence of a large amount of oxygen around the fuel. When ordinary combustion is being performed in this way, the temperature Tf of the fuel and the gas around it becomes considerably higher than when low temperature combustion is being performed, but the temperature of the other gas, constituting the major part, becomes lower when ordinary combustion is being performed compared with when low temperature combustion is being performed. Therefore, as shown by FIG. 9A, the average temperature Tg of the gas in the combustion chamber 5 near top dead center of the compression stroke becomes higher when low temperature combustion is being performed compared with when ordinary combustion is being performed. As a result, as shown by FIG. 9A, the temperature of the burned gas in the combustion chamber 5 after the end of combustion becomes higher when low temperature combustion is being performed compared with when ordinary combustion is being performed. Therefore if low temperature combustion is performed, the temperature of the exhaust gas rises.

Figure 10:
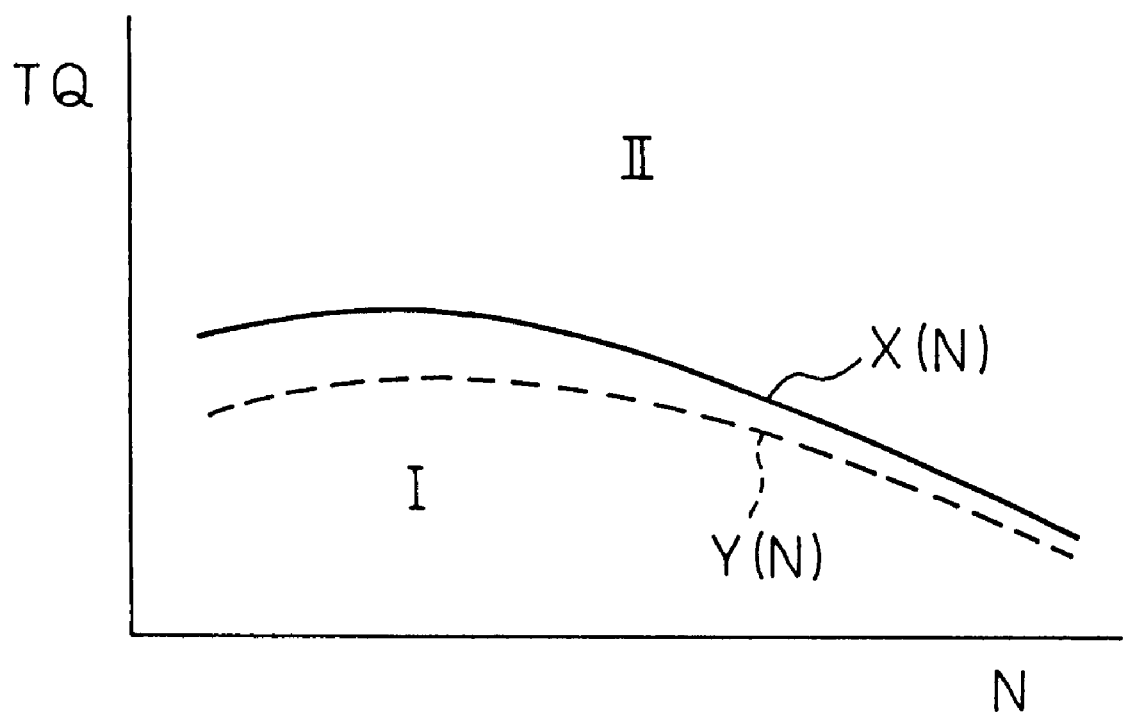
FIG. 10 is a view of first and second operation areas I and II.

It is however only possible to suppress the temperature of the fuel and the gas surrounding it at the time of combustion in the combustion chamber to less than the temperature where, the growth of the hydrocarbons is stopped midway at the time of a relatively low engine load operation where the amount of heat generated by the combustion is relatively small. Accordingly, in this embodiment of the present invention, when the engine is operating at medium or low load, the temperature of the fuel and the gas surrounding it is suppressed to less than the temperature where the growth of the hydrocarbons stops midway and first combustion, that is, low temperature combustion, is performed. When the engine is operating at a high load, a second combustion, that is, the conventionally normally performed combustion, is performed. Note that the first combustion, that is, the low temperature combustion, as is clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks. FIG. 10 shows a first operating region I where the first combustion, that is, the low temperature combustion, is performed and a second operating region II where the second combustion, that is, the combustion by the conventional combustion method, is performed. Note that in FIG. 10, the abscissa TQ shows the required torque, and the ordinate N shows the engine rotational speed. Further, in FIG. 10, X(N) shows a first boundary between the first operating region I and the second operating region II, while Y(N) shows a second boundary between the first operating region I and the second operating region II. The change of the operating region from the first operating region I to the second. operating region II is judged based on the first boundary X(N), while the change of the operating region from the second operating region II to the first operating region I is judged based on the second boundary Y(N).

That is, when the engine is operating in the state of the first operating region I and low temperature combustion is being performed, if the required torque TQ exceeds the first boundary X(N), which is a function of the engine rotational speed N, it is judged that the operating region has shifted to the second operating region II and combustion is performed by the conventional combustion method. Next, when the required torque TQ falls below the second boundary Y(N), which is a function of the engine rotational speed N, it is judged that the operating region has shifted to the first operating region I and low temperature combustion is again performed.

The two boundaries, that is, the first boundary X(N) and the second boundary Y(N) at the lower load side from the first boundary X(N), are provided for the following two reasons. The first reason is that at the high load side of the second operating region II, the combustion temperature is relatively high and even if the required torque TQ becomes lower than the first boundary X(N) at that time, low temperature combustion cannot be performed immediately. That is, unless the required torque TQ becomes considerably low, that is, becomes lower than the second boundary Y(N), low temperature combustion cannot be started immediately. The second reason is to provide hysteresis with respect to the change of the operating regions between the first operating region I and the second operating region II.

Next, a brief explanation will be given of control of the operation in the first operating region I and the second operating region II with reference to FIG. 11.

Figure 11:
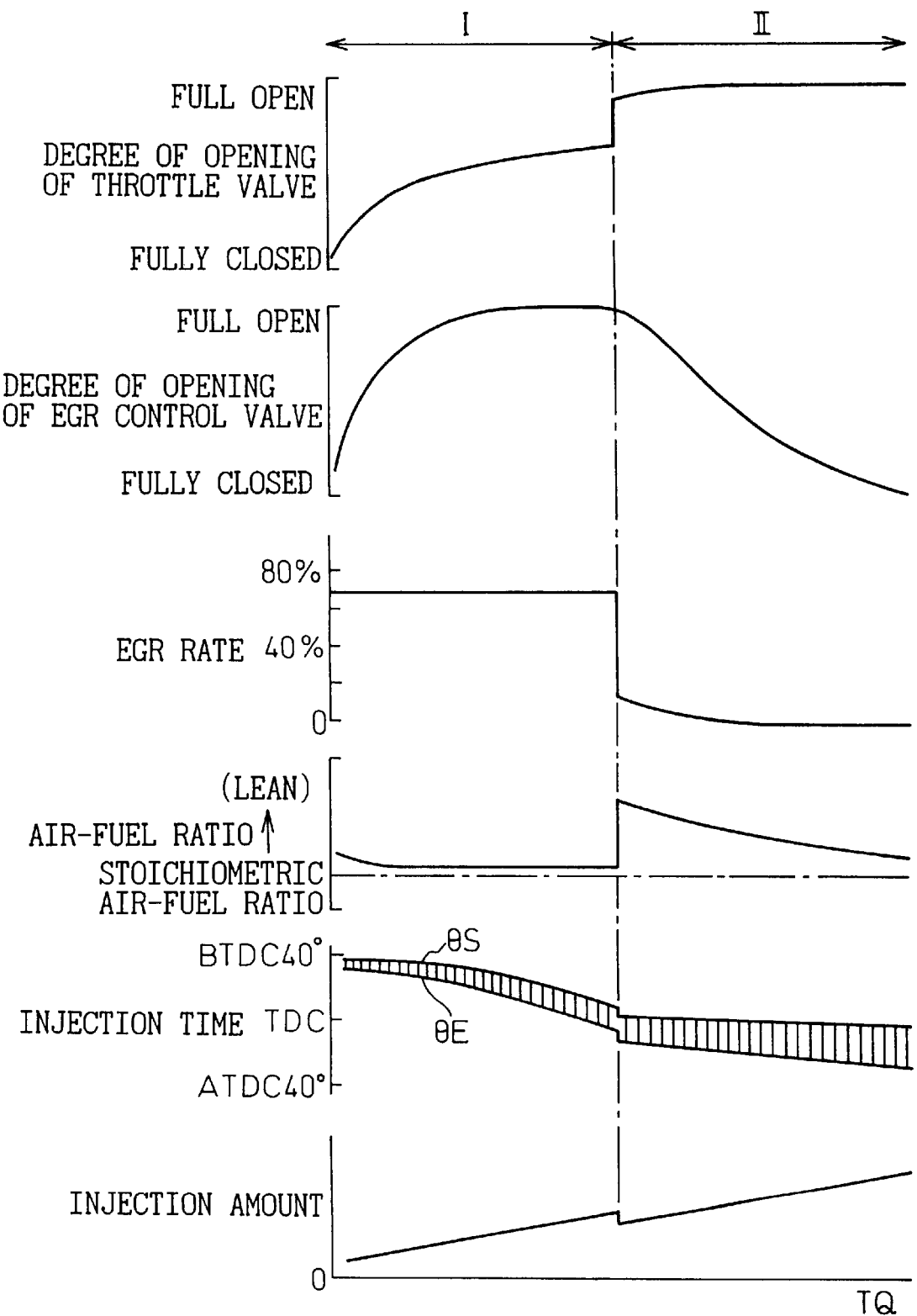
FIG. 11 shows an opening degree of a throttle valve, etc.

FIG. 11 shows the opening degree of the throttle valve 21, the opening degree of the EGR control valve 29, the EGR rate, the air-fuel ratio, the injection timing, and the amount of injection with respect to the required torque TQ. As shown in FIG. 11, in the first operating region I with the low required torque TQ, the opening degree of the throttle valve 21 is gradually increased from close to the fully closed state to a ⅔ opened state as the required torque TQ becomes higher, while the opening degree of the EGR control valve 29 is gradually increased from close to the fully closed state to the fully opened state as the required torque TQ becomes higher. Further, in the example shown in FIG. 11, in the first operating region I, the EGR rate is made about 70 percent and the air-fuel ratio is made a slightly lean air-fuel ratio.

In other words, in the first operating region I, the opening degree of the throttle valve 21 and the opening degree of the EGR control valve 29 are controlled so that the EGR rate becomes about 70 percent and the air-fuel ratio becomes a slightly lean air-fuel ratio. Further, in the first operating region I, the fuel is injected before top dead center of the compression stroke TDC. In this case, the injection start timing θS becomes later the higher the required torque TQ. The injection end timing θE also becomes later the later the injection start timing θS.

Note that, during idling operation, the throttle valve 21 is made to close to close to the fully closed state. At this time, the EGR control valve 29 is also made to close to close to the fully closed state. If the throttle valve 21 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 21 can be closed to close to the fully closed state to suppress vibration in the engine body 1.

On the other hand, when the engine operating state changes from the first operating region I to the second operating region II, the opening degree of the throttle valve 21 is made to increase in steps from the ⅔ opened state to the fully opened state. At this time, in the example shown in FIG. 11, the EGR rate is made to be reduced in steps from about 70 percent to not more than 40 percent, and the air-fuel ratio is enlarged in steps. That is, since the EGR rate jumps over the range of EGR rate where a large amount of smoke is produced (FIG. 7), a large amount of smoke is no longer produced when the engine operating region changes from the first operating region I to the second operating region II.

In the second operating region II, the second combustion, that is, the conventionally performed combustion, is performed. In this combustion method, some soot and $NO_x$ are produced, but the heat efficiency is higher than with low temperature combustion and therefore when the engine operating region changes from the first operating region I to the second operating region II, as shown in FIG. 11, the amount of injection is made to be reduced in steps. At the second operating region II, the throttle valve 21 is, except in some cases, held in the fully opened state and the opening degree of the EGR control valve 29 is made smaller the higher the required torque TQ. Further, at the second operating region, the EGR rate becomes lower the higher the required torque TQ and the air-fuel ratio becomes: smaller the higher the required torque TQ. Even if the required torque TQ becomes high, however, the air-fuel ratio is made a lean air-fuel ratio. Further, in the second operating region II, the injection start timing θS is made close to the top dead center of the compression stroke TDC.

Figure 12:
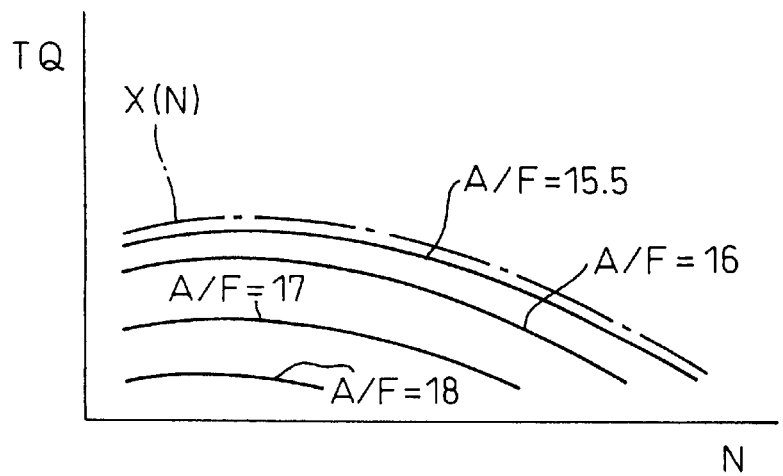
FIG. 12 shows an air fuel ratio in the first operation area I.

FIG. 12 shows the air-fuel ratio A/F in the first operating region I. In FIG. 12, the curves shown by A/F=15.5, A/F=16, A/F=17, and A/F=18 show when the air-fuel ratio is 15.5, 16, 17, and 18. The air-fuel ratios of the curves are determined by proportional distribution. As shown in FIG. 12, in the first. operating region, the air-fuel ratio becomes lean. Further, in the first operating region I, the air-fuel ratio A/F is made leaner the lower the required torque TQ.

That is, the lower the required torque TQ, the smaller the amount of heat generated by the combustion. Accordingly, the lower the required torque TQ, the more low temperature combustion can be performed even if the EGR rate is lowered. If the EGR rate is lowered, the air-fuel ratio becomes larger. Therefore, as shown in FIG. 12, the air-fuel ratio A/F is made larger as the required torque TQ becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required torque TQ becomes.

Figure 13A:
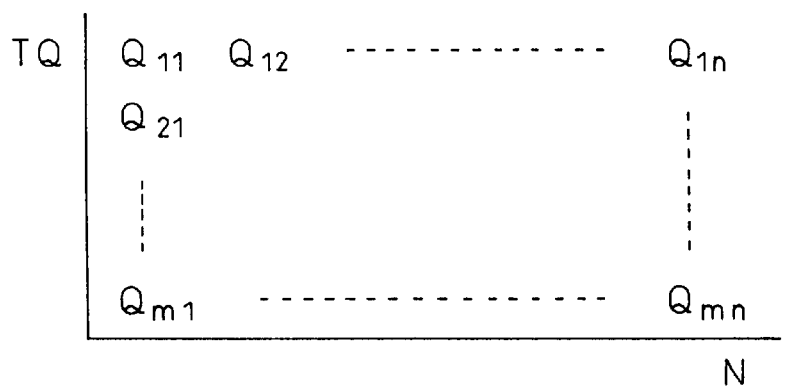
FIGS. 13A and 13B are views of maps of an amount of fuel to be injected, etc.
Figure 13B:
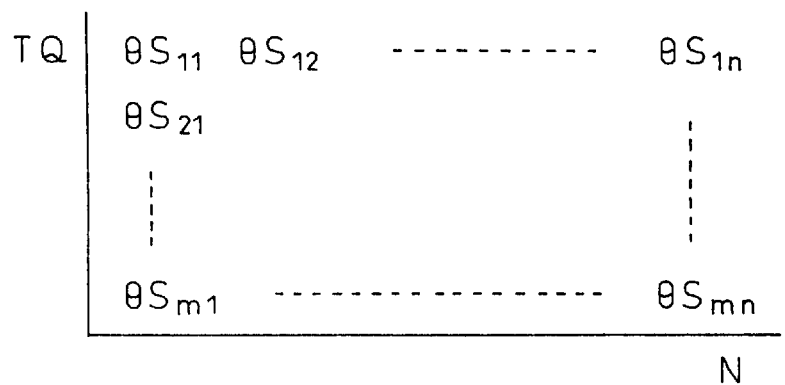

The amount of injection Q in the first operating region I is stored in advance in the ROM 52 in the form of a map as a function of the required torque TQ and the engine rotational speed N as shown in FIG. 13A. The injection start timing θS in the first operating region I, as shown in FIG. 13B, is stored in advance in the ROM 52 in the form of a map as a function of the required torque TQ and engine rotational speed N.

Figure 14A:
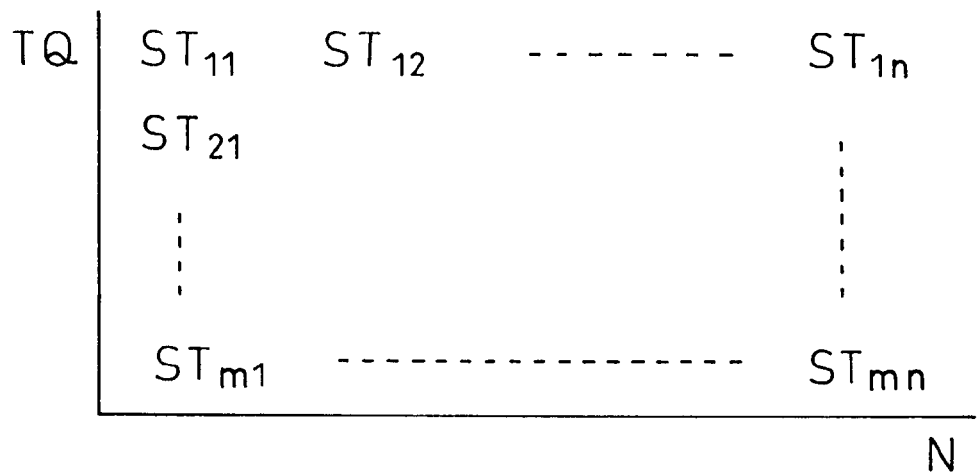
FIGS. 14A and 14B are views of maps of a target opening degree of a throttle valve, etc.
Figure 14B:
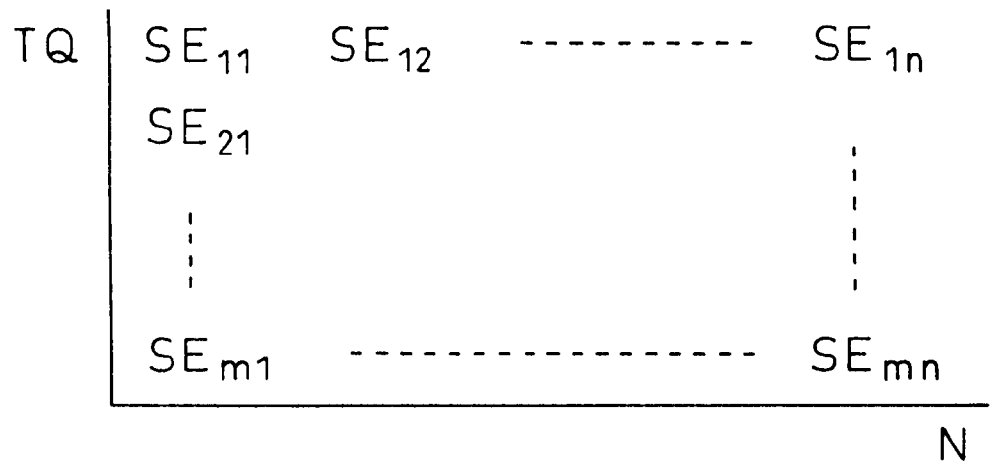

Further, the target opening degree ST of the throttle valve 21 necessary for making the air-fuel ratio the target air-fuel ratio A/F shown in FIG. 12 according to the engine operating-state and making the EGR rate the target EGR rate according to the engine operating state is stored in advance in the ROM 52 in the form of a map as a function of the required torque TQ and the engine rotational speed N.as shown in FIG. 14A. The target opening degree SE of the EGR valve 29 necessary for making the air-fuel ratio the target air-fuel ratio A/F shown in FIG. 12 according to the engine operating state and making the EGR rate the target EGR rate according to the engine operating state is stored in advance in the ROM 52 in the form of a map as a function of the required torque TQ and the engine rotational speed N as shown in FIG. 14B.

Figure 15:
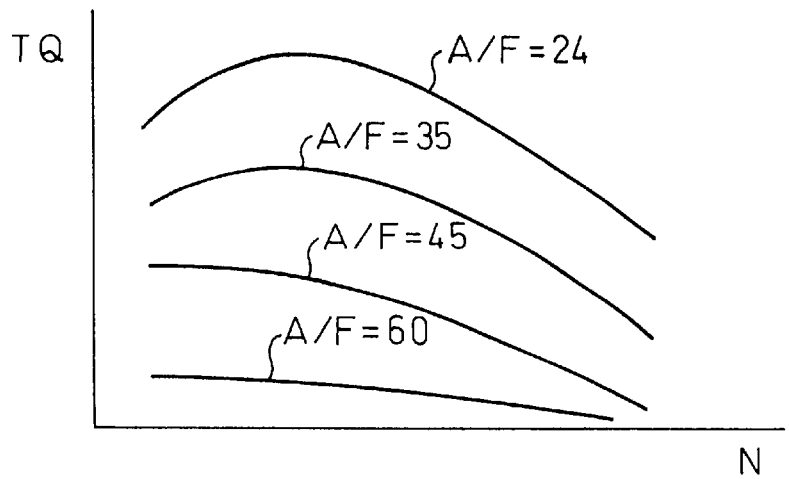
FIG. 15 shows an air fuel ratio in the second operation area II.

FIG. 15 shows the target air-fuel ratio at the time of the second combustion, that is, normal combustion by the conventional combustion method. Note that in FIG. 15, the curves indicated by A/F=24, A/F=35, A/F=45, and A/F=60 respectively show the target air-fuel ratios 24, 35, 45, and 60.

Figure 16A:
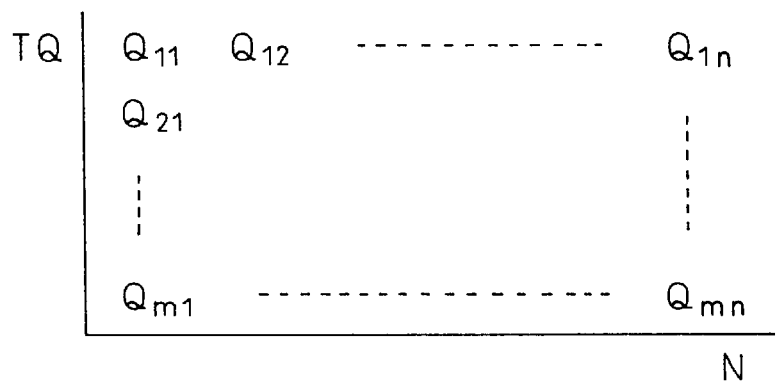
FIGS. 16A and 16B are views of maps of an amount of fuel to be injected, etc.
Figure 16B:
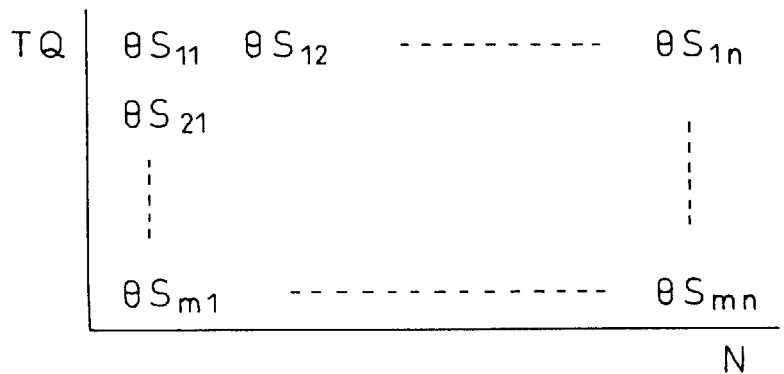

The amount of injection Q at the time of the second combustion is stored in advance in the ROM 52 in the form of a map as a function of the required torque TQ and the engine rotational speed N as shown in FIG. 16A. The injection start timing θS at the time of the second combustion is stored in advance in the ROM 52 in the form of a map as a function of the required torque TQ and the engine rotational speed N as shown in FIG. 16B.

Figure 17A:
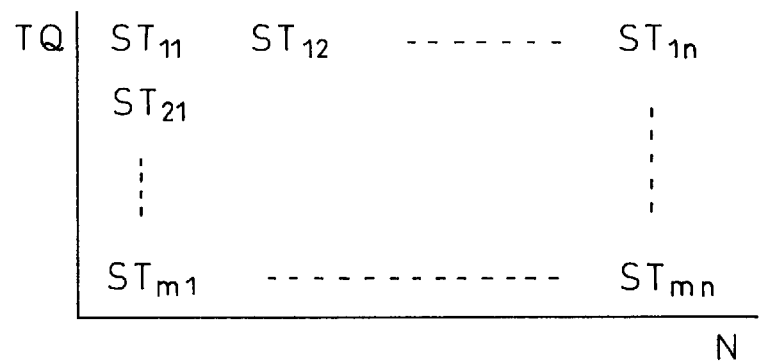
FIGS. 17A and 17B are views of maps of a target opening degree of a throttle valve, etc.
Figure 17B:
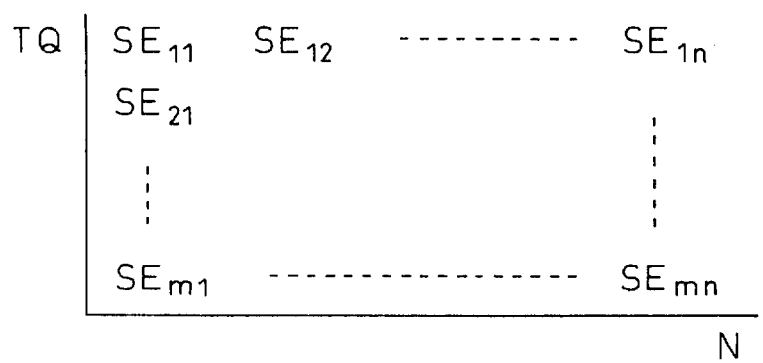

Further, the target opening degree ST of the throttle valve 21 necessary for making the air-fuel ratio the target air-fuel ratio A/F shown in FIG. 15 according to the engine operating state and making the EGR rate the target EGR rate according to the engine operating state is stored in advance in the ROM 52 in the form of a map as a function of the required torque TQ and the engine rotational speed N as shown in FIG. 17A. The target opening degree SE of the EGR valve 29 necessary for making the air-fuel ratio the target air-fuel ratio A/F shown in FIG. 15 according to the engine operating state and making the EGR rate the target EGR rate according to the engine operating state is stored in advance in the ROM 52 in the form of a map as a function of the required torque TQ and the engine rotational speed N as shown in FIG. 17B.

In this embodiment, a requested output is totally output to the crank shaft by combining the outputs of the engine, and the electric motor. Next, this will be explained in detail.

Figure 18:
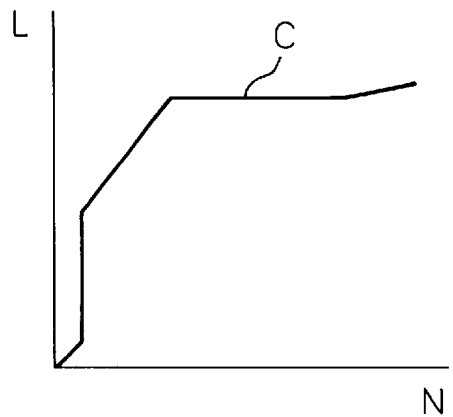
FIG. 18 is a view of a curve where the mileage of the engine is optimal.

In the engine operation, there are combinations of the engine speed and the engine load wherein the mileage of the engine is optimal. These combinations make a curve C shown in FIG. 18. Therefore, if the engine is operated at the engine speed and the engine load which are located on the curve C, the fuel consumption of the engine would be smallest. Thus, according to this embodiment, the engine is operated at the engine speed and the engine load which are located on the curve C shown in FIG. 18 on the basis of the possible output of the electric motor 37 and the requested output (or the requested load). In this case, when the output of the engine does not reach the requested output, the shortage of the output of the engine relative to the requested output is supplemented by the output of the electric motor. On the other hand, when the output of the engine exceeds the requested output, the electric motor 37 is operated as a generator by the excess output of the engine relative to the requested output to generate an electric power, and this electric power is stored in the battery 41. According to this, the requested output is surely output while the fuel consumption of the engine is maintained small.

The $NO_x$ absorbent 24 which is housed in the casing 25 absorbs the $NO_x$ included in the exhaust gas when the air fuel ratio of the exhaust gas flowing thereinto is lean, and releases the absorbed $NO_x$ when the air fuel ratio of the exhaust gas flowing thereinto becomes stoichiometric or rich. The $NO_x$ released from the $NO_x$ absorbent 24 is purified by a reduction agent (for example, hydrocarbon) included in the exhaust gas.

In the above explained $NO_x$ absorbent 24, there is a lower temperature limit within a range where the $NO_x$ absorbent is activated to purify the $NO_x$. That is, in order to activate and to begin the action of purification of the $NO_x$ absorbent 24, it is necessary to maintain the temperature of the $NO_x$ absorbent 24 higher than a certain temperature. In this embodiment, in order to maintain the temperature of the $NO_x$ absorbent 24 higher than the lower limit of the activation temperature, the heat of the exhaust gas flowing into the $NO_x$ absorbent 24 is used other than a special device such as a heater.

However, depending on the state of the engine operation, in particular, in a part of the normal engine operation, the temperature of the exhaust gas is low, and thus, the temperature of the $NO_x$ absorbent 24 may be lower than the activation temperature thereof. Therefore, in this case, in order to activate the $NO_x$ absorbent 24, it is necessary to forcibly increase the temperature of the $No_x$ absorbent 24 to above the activation temperature thereof.

For this end, in this embodiment, when the temperature of the $No_x$ absorbent 24 is lower than the activation temperature thereof and the amount of charged electric power in the battery 41 reaches a predetermined amount (requested amount), the engine is caused to be operated under the above explained low temperature combustion mode. On the other hand, if the amount of charged electric power in the battery 41 does not reach the predetermined amount, the output of the engine is increased. As explained above, under the low temperature combustion mode, the temperature of the exhaust gas discharged from the combustion chamber 5 is high, and thus, the temperature of the $NO_x$ absorbent 24 is increased. At that time, the output of the electric motor 37 is increased to supplement the decrease of the output of the engine which occurs by operating the engine under the low temperature combustion mode. On the other hand, when the output of the engine is increased, the temperature of the exhaust gas is increased, and thus, the temperature of the $NO_x$ absorbent 24 is increased. At that time, the increase of the output of the engine which occurs by increasing the output of the engine is stored as an electric power in the battery 41 by driving the electric motor 37 as a generator by the increased output of the engine. Note that the output of the engine is increased by increasing the engine load, or increasing the engine speed.

Generally, the mileage of the engine would become low if the output of the engine is increased in order to increase the temperature of the $NO_x$ absorbent 24. However, in this embodiment, the output of the engine is increased as long as the amount of charged electric power in the battery 41 is smaller than the predetermined amounts, and the excess output of the engine relative to the requested output may be stored in the battery 41. Thus, the fuel consumption of the engine is maintained small.

Further, generally, for surely outputting the requested output, when the amount of charged electric power becomes small, it is necessary to increase the output of the engine increasing the amount of charged electric power in the battery 41. According to this embodiment, when the temperature of the $NO_x$ absorbent 24 should be increased, the battery 41 is electrically charged. According to this, since the times of performing the operation to increase the output of the engine only to electrically charge the battery 41 become few, the fuel consumption of the engine is maintained small.

In the above explained embodiment, whether the engine should be operated under the low temperature combustion mode or the output of the engine should be increased may be judged on the basis of the conditions other than the amount of charged electric power in the battery 41.

Next, a control of the engine operation including a control to increase the temperature of the $NO_x$ absorbent according to this embodiment will be explained, referring to the flowchart shown in FIGS. 19 and 20.

Figure 19:
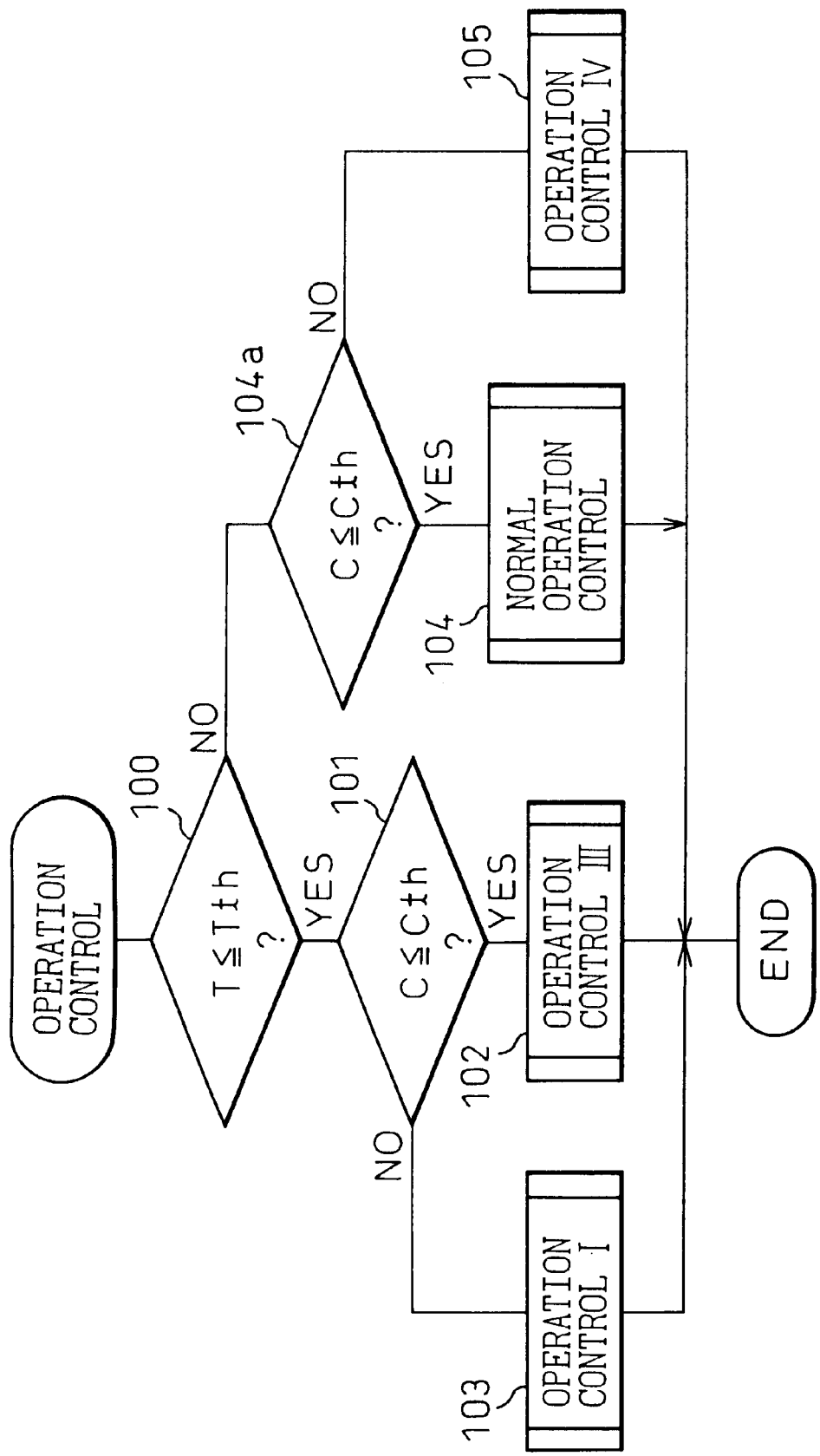
FIG. 19 shows a flowchart of performing an engine operation control.

Initially, at step 100 of FIG. 19, it is judged if the temperature T of the $NO_x$ absorbent 24 is lower than or equal to a predetermined temperature Tth (T≦Tth). The predetermined temperature Tth is set to a temperature within a range of temperature wherein the $NO_x$ absorbent 24 is activated. When it is judged that T≦Tth at step 100, the routine proceeds to step 101.

At step 101, it is judged if the amount C of charged electric power in the battery 41 is smaller than or equal to a predetermined amount Cth (C≦Cth). When it is judged that C≦Cth at step 101, an operation control III is performed at step 102. That is, in order to output an output larger than that output at the later explained normal engine operation, the target opening degree ST of the throttle valve 21 calculated on the basis of the map of FIG. 17A is corrected and, then, the opening degree of the throttle valve 21 is controlled to this corrected target opening degree and, then, the target opening degree SE of the EGR control valve 29 calculated on the basis of the map of FIG. 17B is corrected and, then, the opening degree of the EGR control valve is controlled to this corrected target opening degree and, then, the target amount Q of the fuel to be injected calculated on the basis of the map of FIG. 16A is corrected and, then, the target time θS of the fuel injection calculated on the basis of the map of FIG. 16B is corrected and, then, the corrected target amount of the fuel is injected at the corrected time of the fuel injection.

On the other hand, when it is judged that C>Cth at step 101, the routine proceeds to step 103 where an operation control I, that is, the low temperature combustion mode is performed. Concretely, a target opening degree ST of the throttle valve 21 is calculated on the basis of the map shown in FIG. 14A and, then, the opening degree of the throttle valve 21 is controlled to the calculated target opening degree ST and, then, a target opening degree SE of the EGR control valve 31 is calculated on the basis of the map shown in FIG. 14B and, then, the opening degree of the EGR control valve 29 is controlled to the calculated target opening degree SE and, then, a target amount Q of the fuel to be injected is calculated on the basis of the map shown in FIG. 13A and, then, a target time θS of the fuel injection is calculated on the basis of the map shown in FIG. 13B and, then, the calculated target amount Q of the fuel is injected at the calculated target time θS of the fuel injection.

When it is judged that T>Tth at step 100, the routine proceeds to step 104a where it is judged if an amount C of charged electric power in the battery 41 is smaller than or equal to a predetermined amount Cth (C≦Cth). When it is judged that C≦Cth at step 104a, the routine proceeds to step 104 where the normal engine operation is performed according to the flowchart shown in FIG. 20. The normal engine operation means an operation performed when it is not necessary to perform an operation to increase the temperature of the NO, absorbent 24 to the activation temperature thereof.

Figure 20:
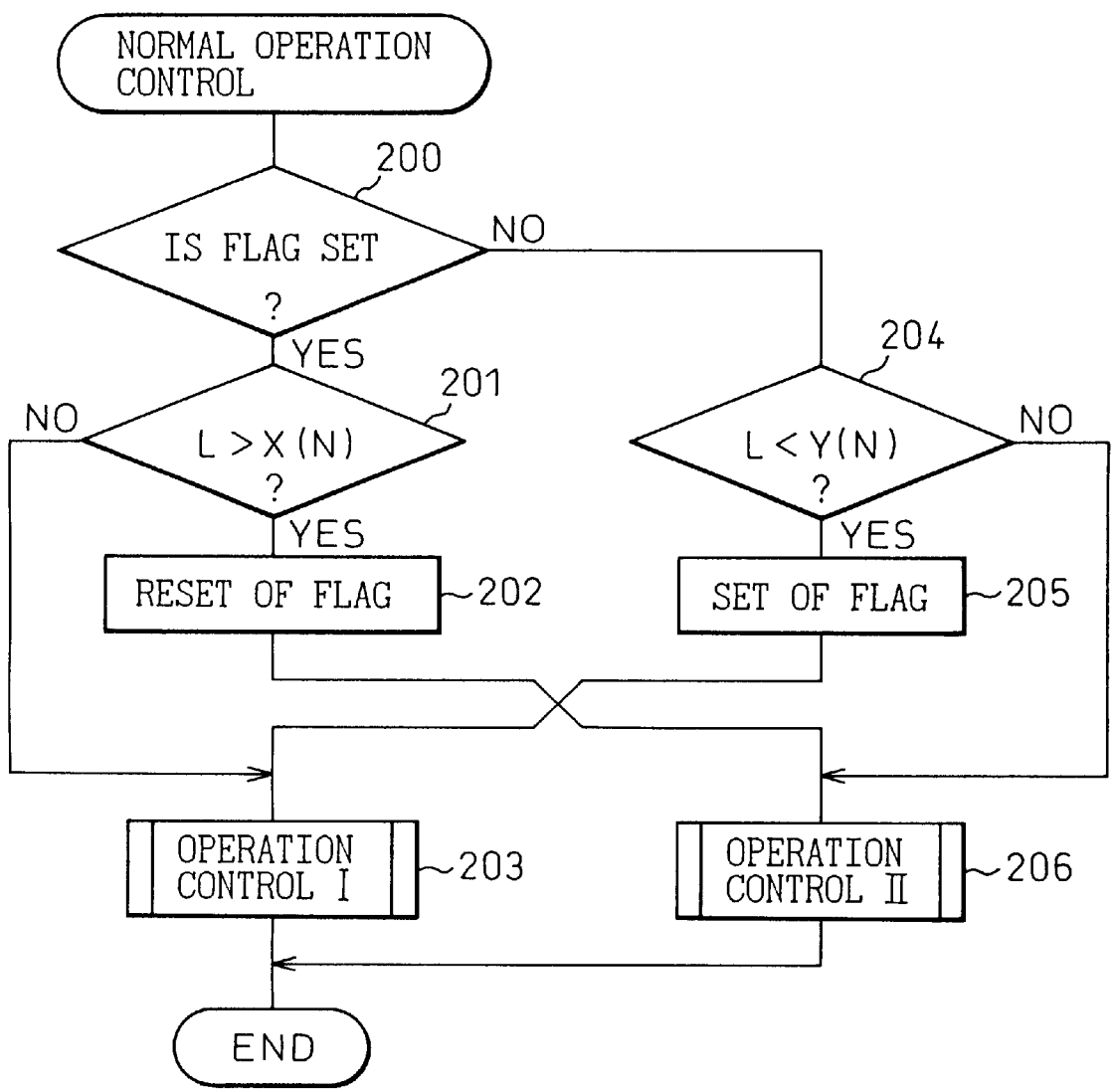
FIG. 20 shows a flowchart of performing a normal engine operation control.

Referring to FIG. 20, initially, at step 200, it is judged if a flag indicating that the engine operation state is in a first engine operation area I is set. When it is judged that the flag is set at step 200, that is, it is judged that the engine operation state is in the first engine operation area I, the routine proceeds to step 201 where it is judged if the requested load L has become larger than a first border line X(N) (L>X(N)).

When it is judged that L>X(N) at step 201, the routine proceeds to step 203 where the engine operation I (i.e., a first combustion mode) is performed. That is, at step 203, a target opening degree ST of the throttle valve 20 is calculated on the basis of the map shown in FIG. 14A and, then, the opening degree of the throttle valve 21 is controlled to this calculated target opening degree ST and, then, a target opening degree SE of the EGR control valve 29 is calculated on the basis of the map shown in FIG. 14B and, then, the opening degree of the EGR control valve 29 is controlled to this calculated target opening degree SE and, then, a target amount Q of the fuel to be injected is calculated on the basis of the map shown in FIG. 13A and, then, a target time θS of the fuel injection is calculated on the basis of the map shown in FIG. 13B and, then, the calculated target amount Q of the fuel is injected from the fuel injector 6 at the calculated target time θS of the fuel injection.

When it is judged that L>X(N) at step 201, the routine proceeds to step 202 where the flag is reset and, then, the routine proceeds to step 206 where an operation control II (i.e., a second combustion mode) is performed. That is, at step 206, a target opening degree ST of the throttle valve 21 is calculated on the basis of the map shown in FIG. 17A and, then, the opening degree of the throttle valve 21 is controlled to this calculated target opening degree ST and, then, a target opening degree SE of the EGR control valve 29 is calculated on the basis of the map shown in FIG. 17B and, then, the opening degree of the EGR control valve 29 is controlled to this calculated target opening degree SE and, then, a target amount Q of the fuel to be injected is calculated on the basis of the map shown in FIG. 16A and, then, a target time θS of the fuel injection is calculated on the basis of the map shown in FIG. 16B and, then, the calculated target amount Q of the fuel is injected from the fuel injector 6 at the calculated target time θS of the fuel injection.

When it is judged that C>Cth at step 104a, the routine proceeds to step 105 where an operation control IV is performed. According to the operation control IV, the engine operation is stopped, and the requested output is output only by the electric motor 37.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine wherein, when an amount of an inert gas in a combustion chamber becomes large, an amount of generation of soot gradually increases to a peak, and when the amount of the inert gas in the combustion chamber becomes even larger, a temperature of fuel and a temperature of a gas around the fuel at a combustion of the fuel in the combustion chamber becomes lower than a temperature which soot is generated and, thus, almost no soot is generated, comprising;

means for selectively performing a first combustion mode in which the amount of the inert gas in the combustion chamber is larger than that of the inert gas in which the amount of generation of the soot is a peak, and a second combustion mode in which the amount of the inert gas in the combustion chamber is smaller than that in which the amount of generation of the soot is a peak;

an exhaust gas purification catalyst arranged in an engine exhaust passage for purifying components included in an exhaust gas;

an electric motor for outputting an output separated from the output of the engine, when the engine is operated such that the engine outputs a value of the output determined on the basis of the engine operation state, the output off the electric motor supplementing the shortage of the output of the engine relative to the requested output; and means for selectively performing a first control to operate the engine such that the engine outputs an output larger than the value of the output determined on the basis of the engine operation state, and a second control to operate the engine under the first combustion mode;

wherein, when the temperature of the exhaust gas purification catalyst should be increased, one of the first and second controls is performed on the basis of a predetermined conditions.

2. A compression ignition type engine as set forth in claim 1, wherein the engine further comprises a battery, and when the output of the engine is larger than the value of the output determined on the basis of the engine operation state, the electric motor is driven as a generator by the output of the engine to store the output of the engine in the battery as an electric power, and when the temperature of the exhaust gas purification catalyst should be increased and the amount of charged electric power in the battery is smaller than a requested amount, the first control is performed, and on the other hand, when the temperature of the exhaust gas purification catalyst should be increased and the amount of charged electric power in the battery is larger than the requested amount, the second control is performed.

3. A compression ignition type engine as set forth in claim 1, wherein the exhaust gas purification catalyst has a $NO_x$ catalyst for purifying the $NO_x$ included in the exhaust gas.

4. A compression ignition type engine as set forth in claim 2, wherein the $NO_x$ catalyst has a $No_x$ absorbent which absorbs the $NO_x$ included in the exhaust gas when the air fuel ratio of the exhaust gas flowing into the catalyst is lean and releases the absorbed $NO_x$ therefrom when the air fuel ratio of the exhaust gas flowing into the catalyst becomes one of the stoichiometric air fuel ratio and rich air fuel ratio.

5. A compression ignition type engine as set forth in claim 1, wherein it is judged that the temperature of the exhaust gas purification catalyst should be increased when the temperature of the exhaust gas purification catalyst is lower than a temperature in which the catalyst is activated, to purify the components included in the exhaust gas.

* * * * *